Sept. 4, 1928.　　　　　J. W. HOWELL　　　　1,683,188
BEARING PULLER
Filed April 21, 1927　　　2 Sheets-Sheet 2
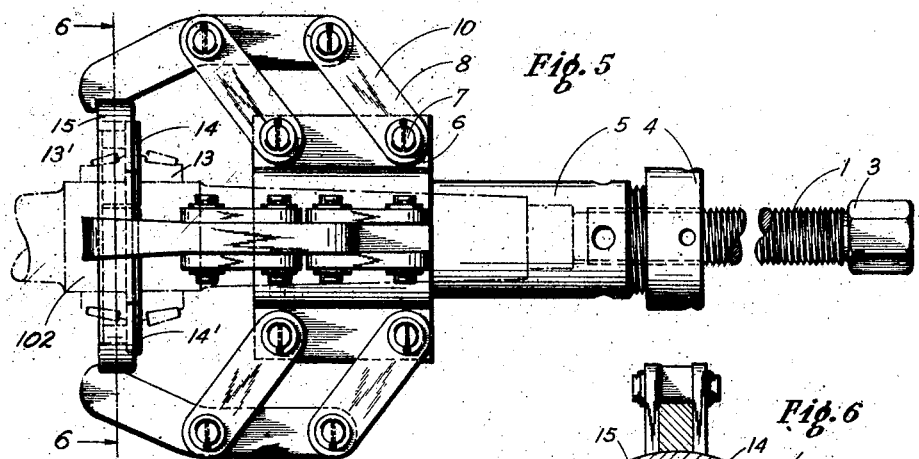
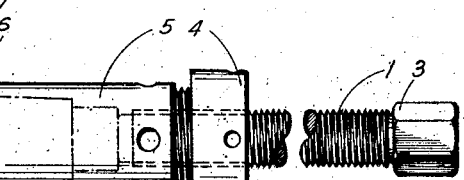
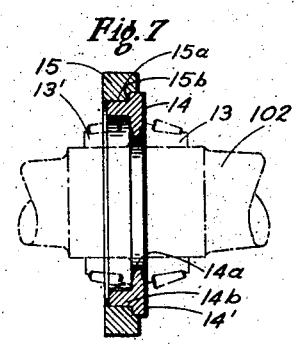
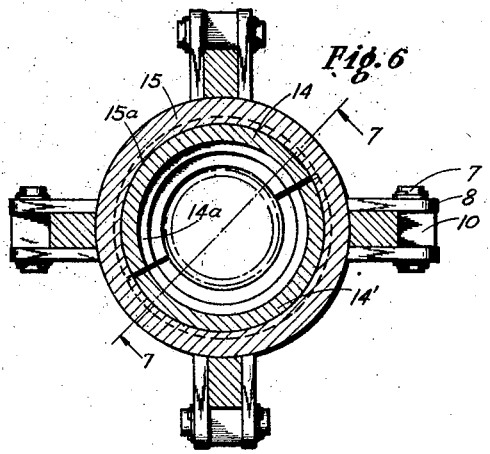
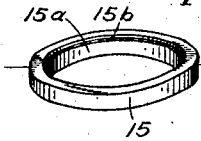
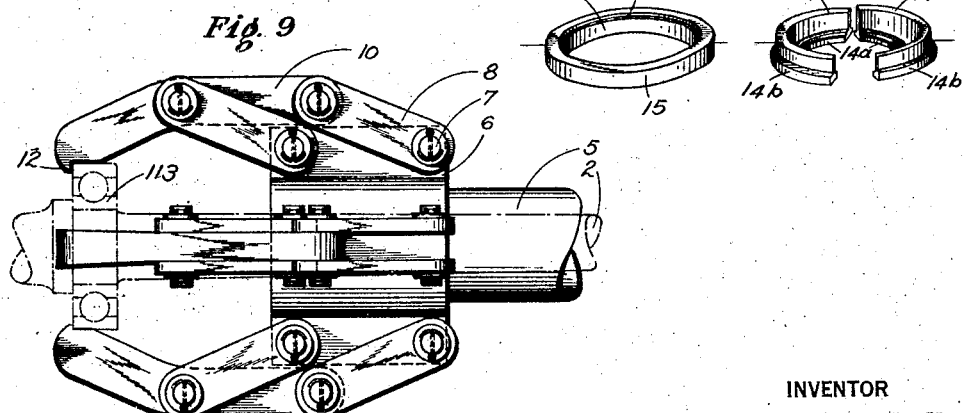
INVENTOR
JAMES W. HOWELL
BY Richey + Watts
ATTORNEYS Patented Sept. 4, 1928.

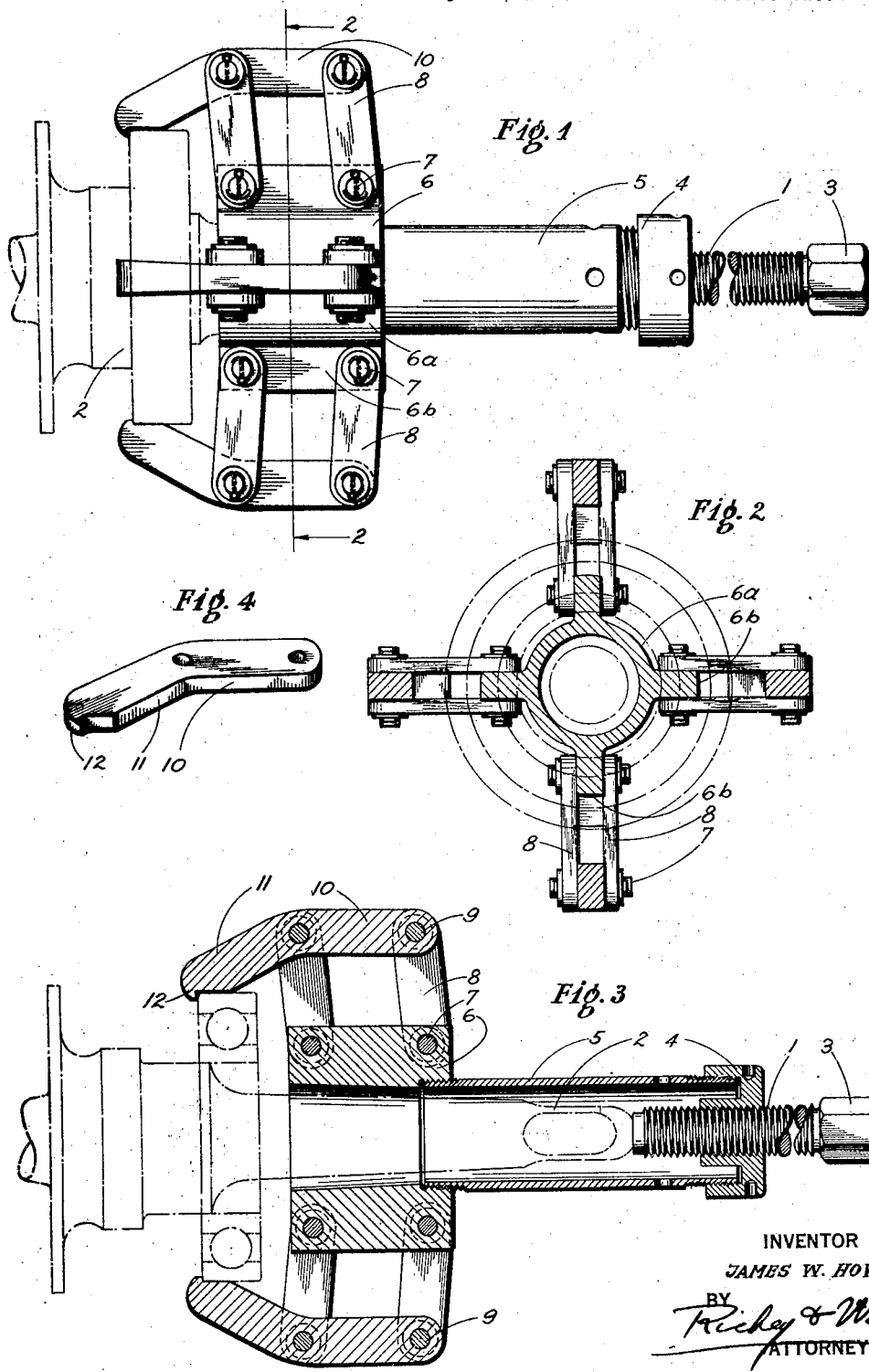

1,683,188

UNITED STATES PATENT OFFICE.

JAMES W. HOWELL, OF CLEVELAND, OHIO, ASSIGNOR TO THE WHITE MOTOR COMPANY, OF CLEVELAND, OHIO, A CORPORATION OF OHIO.

BEARING PULLER.

Application filed April 21, 1927. Serial No. 185,459.

This invention relates to a tool for gripping and longitudinally extracting objects from supports to which they may be secured, and is particularly applicable to the removal of wheels, gears, bearings and the like, which have been applied to shafts or axles.

Heretofore many devices have been provided for removing or extracting articles from their mountings, the more common forms of which either comprise a threaded cap which may be attached to a gear or wheel and which carries a screw for exerting pressure on the end of the shaft, or comprise a screw for abutting the end of the shaft and carrying a nut provided with pivoted hooks for engagement with the wheel or gear.

While devices of these types are capable of exerting a powerful pulling action between the part being removed and the shaft, they are not adapted to handling a variety of sizes of the work, are inclined to release or slip off the object at inopportune times, and can not be conveniently used in limited spaces or where the part to be removed is situated closely to other parts on the shaft or axle.

By applications of my invention, these and other difficulties are overcome.

The invention will be better understood from the description of one practical embodiment thereof, illustrated in the accompanying drawing, in which Fig. 1 is a side elevation of one form of apparatus embodying the invention, Fig. 2 is a cross sectional view taken on the line II—II of Figure 1, Fig. 3 is a central longitudinal section of the tool shown in Fig. 1, Fig. 4 is a perspective view of one of the engaging hooks or arms, Fig. 5 is a view similar to Fig. 1 but illustrating the use of a tool in removing the inner race of one of two closely situated roller bearings, Fig. 6 is a cross sectional view taken on line VI—VI of Figure 5, Fig. 7 is a longitudinal sectional view of parts used to engage the bearing race taken on line VII—VII of Fig. 6, Fig. 8 is a perspective view of these parts, in unassembled relation, and Fig. 9 is a fragmentary view similar to Figs. 1 and 5, but showing the tool engaging a bearing of small diameter.

Referring first to Figures 1 to 4 inclusive, the tool comprises a screw 1 adapted to engage the end of a shaft or axle 2 and provided with a head 3 for engagement with a wrench by which it may be rotated. The screw is threaded through a cap or nut 4 carried upon the end of a tubular extension shown as a tube 5, the other end of the tube being secured to a hollow spider or hub 6 which carries the gripping mechanism for engaging the bearing, gear, or the like, which is to be removed from its shaft or axle, the tube and hub constituting a frame for the tool.

The hub 6 consists of a hollow cylindrical central section or body $6^a$, provided on its exterior with longitudinally extending ribs $6^b$, shown as four in number. Each rib has a transversely extending aperture adjacent each end thereof, and a pin 7 extends through each aperture. Pairs of links 8 are pivoted upon the ends of pins 7 adjacent the sides of the ribs, and carry pivoted between their outer ends upon pins 9, gripping arms 10. The links are all of the same length and the distance between apertures in the ribs and arms are the same so that the ribs, links, gripping arms form parallelograms, maintaining the arms always parallel to the longitudinal axis of the tool. The object engaging ends of the arms are inwardly off-set at 11 and terminate in object engaging hook-like ends 12.

It will be seen that the gripping arms may readily be adjusted to take any size of work between the maximum, which is that accommodated when the links 8 extend normally to the longitudinal axis of the tool, and the minimum, which is determined by the arms contacting with the ribs, by simply moving the arms longitudinally of the tube. The angle at which the hooked ends of the arms contact an object does not vary and consequently there is no more tendency for the hooks to slide off objects of one diameter more than those of another. Moreover it will be noted that any pressure exerted by the screw 1 tends to further draw in the arms by closing the parallelograms formed by the arms and links, and so causes the arm to grip the object with a pressure which increases as the pressure exerted by the screw is increased, thus firmly holding the object and precluding any possibility of the tool slipping off.

In Figures 5 to 8, the tool shown in Figures 1 to 4 is illustrated as used to remove one of two bearing races which are so closely situated upon the shaft 102 that the hooks 12 are obstructed and prevented from engaging the race itself. To transmit the force of the tool to the race 13, use is made of the rings best shown in Figure 8, which comprise a divided inner ring consisting of halves 14 and 14' and a continuous outer ring 15. The application of these rings is best illustrated in Figures 6 and 7, from which it will be seen that the halves of the inner ring are placed about the shaft so that the inwardly extending flange 14$^a$ is positioned between the two bearing races 13 and 13'. Prior to the insertion of the halves 14 and 14', the continuous ring 15 has been inserted over the bearings and after the insertion of the halves, this ring is moved into engagement with the outer surfaces thereof, the cylindrical surface 15$^a$ holding the halves of the inner ring together while the shoulder 15$^b$ abuts the marginal flange 14$^b$ and transmits thereto pressure exerted by the screw. The hooks 12 of arms 10 are caused to grip the ring 15 and to transmit through it and the inner ring halves 14 and 14', to the inner surface of bearing race 13, the pressure exerted upon actuation of the screw 1.

In Figure 9, the tool is shown engaging the outer race 113 with a very small ball bearing. It engages this bearing race in the same manner as it engages the larger one of Figures 1 to 4 or the ring of Figures 5 to 8, the parallelograms formed by the arms and links being greatly flattened.

While I have described the illustrated embodiment of my invention in some particularity, this embodiment is shown by way of illustration only and not by way of limitation and I do not limit myself to the details shown and described but claim as my invention all embodiments thereof coming within the scope of the appended claims.

I claim:

1. A tool comprising a screw, a nut threaded thereon, a tubular carrier carried by said nut, there being a plurality of longitudinally extending ribs upon the exterior of said carrier, two pivots extending transversely through each rib, links of equal length carried on each end of each pivot, a gripping arm carrying two pivots similarly spaced to those on each rib, the pivots of one gripping arm being carried by the outer ends of the links on one rib, whereby the gripping arms remain always parallel to the axis of the tool.

2. The combination with a pulling tool including a screw, a nut, and gripping means, of a split ring having an inwardly extending flange adapted to engage parts to be removed, and a continuous ring fitting the exterior of the split ring and adapted to hold the parts together and transmit longitudinal pressure thereto from the gripping means.

3. A tool comprising longitudinal pressure exerting means, gripping means carried thereby, a split ring having an inwardly extending flange adapted to engage parts to be removed, and a continuous ring fitting the exterior of the split ring and adapted to hold the parts together and transmit longitudinal pressure thereto from the gripping means.

4. A tool comprising a tubular body, a plurality of gripping arms connected thereto by parallel link mechanisms, a tubular extension extending from the body in a direction away from the gripping ends of said arms, and longitudinal pressure exerting means at the end of said extension.

5. A tool comprising a tubular body, a plurality of gripping arms connected thereto by parallel link mechanisms, a tube having one end threaded into said body, a nut attached to the other end of said tube, and a longitudinal pressure exerting screw threaded through said nut.

6. A tool comprising a hollow frame adapted to receive the end of an axle or the like, means at one end of said hollow frame for exerting longitudinal pressure upon said axle, and radially movable gripping means at the other end of said section for engaging an article secured to said axle.

In testimony whereof I hereunto affix my signature this 18 day of April, 1927.

JAMES W. HOWELL.